United States Patent
Jendoubi et al.

(10) Patent No.: US 9,309,400 B2
(45) Date of Patent: Apr. 12, 2016

(54) COMPOSITION FOR FLEXIBLE MEMBRANES

(75) Inventors: Elyes Jendoubi, Zurich (CH); Ramin Djamshidian, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/703,842

(22) PCT Filed: Jul. 19, 2011

(86) PCT No.: PCT/EP2011/062360
§ 371 (c)(1),
(2), (4) Date: Dec. 12, 2012

(87) PCT Pub. No.: WO2012/010600
PCT Pub. Date: Jan. 26, 2012

(65) Prior Publication Data
US 2013/0089723 A1    Apr. 11, 2013

(30) Foreign Application Priority Data
Jul. 21, 2010   (EP) .................................... 10170307

(51) Int. Cl.
- C08L 53/00 (2006.01)
- C08L 53/02 (2006.01)
- E04D 5/06 (2006.01)
- C08L 23/02 (2006.01)

(52) U.S. Cl.
CPC ................. *C08L 53/00* (2013.01); *C08L 53/02* (2013.01); *C08L 53/025* (2013.01); *E04D 5/06* (2013.01); C08L 23/02 (2013.01); C08L 2205/02 (2013.01); C08L 2205/03 (2013.01); C08L 2205/16 (2013.01)

(58) Field of Classification Search
None
See application file for complete search history.

(56) References Cited

U.S. PATENT DOCUMENTS

| | | | |
|---|---|---|---|
| 4,659,754 A | | 4/1987 | Edwards et al. |
| 5,543,462 A | * | 8/1996 | Okada et al. .................... 525/74 |
| 5,597,867 A | * | 1/1997 | Tsujimoto et al. ............... 525/74 |
| 6,624,284 B1 | * | 9/2003 | Biedermann et al. ......... 428/502 |
| 7,074,918 B2 | * | 7/2006 | Medoff .................... C08J 5/045 |
| | | | 428/292.1 |
| 2002/0081924 A1 | | 6/2002 | Fensel et al. |
| 2010/0130670 A1 | | 5/2010 | Gelles et al. |
| 2011/0020634 A1 | * | 1/2011 | Paschkowski et al. ........ 428/221 |
| 2011/0143112 A1 | * | 6/2011 | Cai et al. ...................... 428/217 |

FOREIGN PATENT DOCUMENTS

| | | |
|---|---|---|
| CN | A-1327000 | 12/2001 |
| CN | A-1491255 | 4/2004 |
| CN | A-101418099 | 4/2009 |
| DE | 1 795 547 | 7/1973 |
| DE | 20 2004 015 936 U1 | 1/2005 |
| GB | 953750 A | 4/1964 |
| JP | 2009-209273 A | 9/2009 |
| JP | 2009-209274 A | 9/2009 |

OTHER PUBLICATIONS

Non-Patent Literature Reference No. 1—"Typical Engineering Properties of High Density Polyethylene"—<http://www.ineos.com/Global/Olefins%20and%20Polymers%20USA/Products/Technical%20information/Typical%20Engineering%20Properties%20of%20HDPE.pdf>.*
International Search Report issued in Application No. PCT/EP2011/062360; Dated Sep. 9, 2011 (With Translation).
Apr. 24, 2014 Office Action issued in Chinese Patent Application No. 201180034539.3 w/translation.
Gao Jun et al.; "New thermoplastic elastomer SEBS," New Chemical Materials, vol. 32, No. 4, pp. 21-24; Apr. 30, 2004. w/English Abstract only.
Mar. 10, 2015 Office Action issued in Japanese Application No. 2013-520129.

* cited by examiner

*Primary Examiner* — David Sample
*Assistant Examiner* — Donald M Flores, Jr.
(74) *Attorney, Agent, or Firm* — Oliff PLC

(57) ABSTRACT

A composition including a styrene block copolymer, a polar-modified styrene block copolymer, plant fibers and a polyolefin solid at 25° C., and to molded bodies, especially membranes, produced from such compositions.

19 Claims, No Drawings

COMPOSITION FOR FLEXIBLE MEMBRANES

TECHNICAL FIELD

The invention is directed to a composition, suitable in particular for the production of roofing membranes.

The invention is also directed to a molded body obtained by extrusion and/or calendering of such a composition as well as a method for producing a molded body.

STATE OF THE ART

For sealing substrates to prevent water from seeping through, sealing membranes made of renewable raw materials are known in the construction industry. Compositions that are flexible, are characterized by mechanical strength, and have a low water absorption are needed for such seals. In addition, such compositions should preferably be suitable for processing by extrusion or injection molding.

DESCRIPTION OF THE INVENTION

The object of the present invention is therefore to make available a composition of the type defined in the introduction.

This is achieved by a composition comprising a styrene block copolymer, a polar modified styrene block copolymer, plant fibers, and polyolefin.

The core of the invention is thus that the composition comprises:
  a) 20-90% by weight styrene block copolymer SB selected from the group consisting of styrene/isoprene block copolymer (SIS), styrene/ethylene-butylene/styrene block copolymer (SEBS), styrene/ethylene-propylene/styrene block copolymer (SEPS) and styrene/ethylene-propylene block copolymer (SEP);
  b) 0.08-10% by weight polar modified styrene block copolymer PS;
  c) 1-50% by weight plant fibers PF; and
  d) 0.05-20% by weight polyolefin P that is solid at 25° C.

The advantages of the invention can be seen among other things in the fact that the composition is characterized by a high strength and elasticity. Furthermore, the composition permits inexpensive and ecological manufacturing and has a surprisingly low water absorption.

It is especially advantageous for the processability and the mechanical properties, in particular the elasticity, of the composition if the composition additionally contains
  e) 4-45% by weight of:
  soft resin WH having a softening point between −10° C. and 40° C., measured by the ring and ball method according to DIN EN 1238,
  and/or
  mineral oil ML, in particular naphthenic mineral oil.

It is especially advantageous for the strength of the composition if the plant fibers PF have a ratio of the length of the plant fibers to the diameter of the plant fibers of 3:1-20:1. In addition, such a ratio allows easier incorporation of the plant fibers PF into the composition.

It is also advantageous for low water absorption and for the strength of the composition if the ratio of the % by weight based on the composition of polar modified styrene block copolymer PS: plant fibers PF amounts to 0.01-0.5.

Additional aspects of the invention are the subject matter of additional independent claims. Especially preferred embodiments of the invention are the subject matter of the dependent claims.

METHOD OF EMBODYING THE INVENTION

In a first aspect the present invention relates to a composition comprising:
  a) 20-90% by weight styrene block copolymer SB selected from the group consisting of styrene/isoprene block copolymer (SIS), styrene/ethylene-butylene/styrene block copolymer (SEBS), styrene/ethylene-propylene/styrene block copolymer (SEPS) and [sic] styrene/ethylene-propylene block copolymer (SEP);
  b) 0.08-10% by weight polar modified styrene block copolymer PS;
  c) 1-50% by weight plant fibers PF;
  d) 0.05-20% by weight polyolefin P that is solid at 25° C.

The styrene block copolymer SB is preferably styrene/ethylene-butylene/styrene block copolymer (SEBS).

The styrene block copolymer SB preferably has an elongation at break of ≥200%, preferably ≥300%, and has a tensile strength of ≥10 MPa, preferably ≥20 MPa, both measured according to DIN EN ISO 527.

Polyolefin P is preferably a polyolefin P which has a softening point between 70° C. and 170° C., in particular between 80° C. and 120° C., preferably between 90° C. and 110° C., measured by the ring and ball method according to DIN EN 1238.

In the present document, the softening point is understood to be the softening point measured by the ring and ball method according to DIN EN 1238.

The polyolefin P is typically a thermoplastic poly-α-olefin, preferably an atactic poly-α-olefin (APAO).

These atactic poly-α-olefins can be produced by polymerization of α-olefins, in particular ethene, propene and 1-butene, for example, using Ziegler catalysts. Homopolymers or copolymers of α-olefins can be produced. They have an amorphous structure in comparison with other polyolefins.

In this document, an "α-olefin" is understood in the usual definition to be an alkene of the empirical formula $C_xH_2$, (where x corresponds to the number of carbon atoms), which has a C—C double bond on the first carbon atom (α carbon). Examples of α-olefins include ethylene, propylene, 1-butene, 1-pentene, 1-hexene, 1-heptene and 1-octene.

The amount of polyolefin P is preferably 1-12% by weight, especially 5-10% by weight based on the composition. This is advantageous with respect to the elongation at break behavior of the composition.

The molecular weight $M_n$ of the polyolefin P amounts to between 7000 g/mol and 25,000 g/mol in particular.

The term "polymer" in the present document comprises, on the one hand, a group of macromolecules which are uniform chemically but are different with regard to the degree of polymerization, the molecular weight and the chain length and are produced by a polyreaction (polymerization, polyaddition, polycondensation). On the other hand, the term also includes derivatives of such a group of macromolecules from polyreactions, i.e., compounds which were obtained by reactions such as additions or substitutions of functional groups on given macromolecules and which may be chemically uniform or chemically non-heterogeneous. The term also includes so-called prepolymers, i.e., reactive oligomeric preadducts, the functional groups of which are involved in the synthesis of macromolecules.

The term "molecular weight" is always understood in the present document to refer to the average molecular weight $M_n$ (number average).

"Room temperature" in the present document is understood to refer to a temperature of 23° C.

The designations printed in bold such as P, SB, PS, PF, WH, ML and the like in the present document are used solely for a better understanding and identification on the part of the reader.

The composition additionally contains 0.08-10% by weight polar modified styrene block copolymer PS.

Suitable polar modified styrene block copolymers PS are formed by grafting polar olefin monomers, for example, α,β-unsaturated carboxylic acids and/or derivatives thereof, such as (meth)acrylic acid or maleic anhydride, onto styrene block copolymers.

The polar modified styrene block copolymer PS is preferably a maleic anhydride-grafted styrene block copolymer.

Suitable styrene block copolymers as the basis for synthesizing polar modified styrene block copolymers PS are selected from the group consisting of styrene/isoprene block copolymers (SIS), styrene/ethylene-butylene/styrene block copolymers (SEBS), styrene/ethylene-propylene/styrene block copolymers (SEPS) and styrene/ethylene-propylene block copolymers (SEP), preferably styrene/ethylene-butylene/styrene block copolymers (SEBS).

The polar modified polyolefin wax PS is preferably a maleic anhydride-grafted styrene/ethylene-butylene/styrene block copolymer (SEBS).

The degree of grafting of the polar modified styrene block copolymer PS is advantageously more than 1% by weight, in particular more than 1.4% by weight, polar olefin monomers, in particular maleic anhydride, based on the weight of the styrene block copolymer. This degree of grafting is preferably between 1.4 and 10% by weight.

The amount of polar modified styrene block copolymer PS is preferably 0.5-5% by weight, especially 1-2.5% by weight, in particular preferably 1.5-2.5% by weight, based on the composition.

It has surprisingly been found that the polar modified styrene block copolymer PS contributes significantly toward improvements in the mechanical and physical properties of the composition, in particular in comparison with other compatibilizers, also known as compatibility imparting agents, such as polyvinyl butyral, ethylene-butyl acrylate/glycidyl methacrylate copolymers or vinyl acetate-ethylene copolymers.

The composition additionally contains 1-50% by weight plant fibers PF.

The term "plant fibers" is used in the present document to refer to a linear structure of plant origin which is thin and flexible in relation to its length.

They are typically obtained from plant parts, for example, seed fibers such as cotton, fruit wall fibers such as kapok, bast fibers such as flax, hemp, jute or hard fibers such as sisal and coconut.

The plant fibers PF preferably have a cellulose content of more than 30% by weight, in particular more than 40% by weight, based on the total weight of the plant fibers PF. This is advantageous for the water resistance of the composition in particular.

The plant fibers PF are preferably wood fibers.

The term "wood fibers" is understood in the present document to refer to the essential structural element of wood, which is obtained in processing wood in both mechanical and chemical pulping. Wood fibers still contain lignin and other impurities in addition to cellulose.

Wood fibers can be characterized by their length. Coniferous wood fibers are longer than deciduous wood fibers with typical values of 3.5-6 mm for spruce, pine or fir fibers and 1-1.5 mm for poplar, birch or beech fibers. Lengths of 500-50 µm, 300-100 µm are preferred and coniferous wood fibers are further preferred.

It is advantageous if the plant fibers PF have a ratio of the length of the plant fibers to the diameter of the plant fibers of 3:1-20:1, in particular 5:1-10:1, because such a ratio allows easier incorporation of the plant fibers PF into the composition. Such a ratio also has an advantageous effect on the hardness of the composition.

The composition additionally preferably contains e) 4-45% by weight of:

soft resin WH with a softening point between −10° C. and 40° C., measured according to the ring and the ball method as described in DIN EN 1238, and/or mineral oil ML, in particular naphthenic mineral oil.

Based on the fact that the soft resin WH is very close to the softening point at room temperature (23° C.), it is either already liquid or very soft at room temperature. A soft resin may be a natural resin or a synthetic resin.

In particular, such soft resins WH include medium to high molecular weight compounds from the classes of paraffin resins, hydrocarbon resins, polyolefins, polyesters, polyesters, polyacrylates or amino resins.

The soft resin WH preferably has a softening point between 0° C. and 25° C., in particular between 10° C. and 25° C.

In a preferred embodiment the soft resin WH is a hydrocarbon resin, in particular an aliphatic $C_5$-$C_9$ hydrocarbon resin.

An aliphatic $C_5$ hydrocarbon resin, which is distributed commercially under the brand name Wingtack® 10 by the Cray Valley company, has proven to be especially suitable as a soft resin WH.

Other suitable soft resins include, for example, polyterpene resins, such as those distributed commercially as Sylvares® TR A25 by Arizona Chemical, USA, rosin esters and tall oil resin esters, such as those distributed commercially, for example, as Sylvatac® RE 12, Sylvatac® RE 10, Sylvatac® RE 15, Sylvatac® RE 20, Sylvatac® RE 25 or Sylvatac® RE 40 by Arizona Chemical USA.

Additional suitable soft resins include, for example, Escorez™ 5040 (Exxon Mobile Chemical).

Other suitable hydrocarbon resins as soft resins include, for example, Picco A10 (Eastman Kodak) and Regalite R1010 (Eastman Kodak).

The amount of soft resins WH is preferably 10-40% by weight, in particular 20-30% by weight, based on the composition.

The term "mineral oil" is understand in the present document to include liquid distillation products obtained from mineral raw materials such as petroleum, lignite and hard coal, wood and peat, which consists essentially of mixtures of saturated hydrocarbons. Mineral oils ML are preferred for reasons of cost.

Naphthenic mineral oil is preferred as the mineral oil ML because of its good compatibility with the composition.

Preferred mineral oils include those available commercially under the brand name Shell Ondina 917 and 933 from Shell Deutschland Oil GmbH, Germany.

The amount of mineral oil ML is preferably 10-40% by weight, in particular 20-30% by weight, based on the composition.

In comparison with an additional amount of e) 4-45% by weight of soft resin WH or an additional amount of e) 4-45% by weight of soft resin WH and mineral oil ML, an additional amount e) of 4-45% by weight of mineral oil ML is preferred.

In a preferred embodiment, the composition has a ratio of the % by weight, based on the composition, of polar modified styrene block copolymer PS: plant fibers PF of 0.01-0.5, in particular 0.05-0.1. This is advantageous because it reduces the water absorption of the composition and increases the tensile strength, the E modulus, the elongation at break as well as the hardness.

In addition, the composition may also contain other ingredients. Other ingredients that are suitable include in particular components selected from the group comprising plasticizers, adhesion promoters, UV absorbents, UV stabilizers and heat stabilizers, optical brighteners, fungicides, pigments, dyes, fillers and desiccants.

Compositions which consist essentially of styrene block copolymers SB, polar modified styrene block copolymers PS, plant fibers PF, polyolefin P that is solid at 25° C., and optionally soft resins WH with a softening point between −10° C. and 40° C., measured by the ring and ball method of DIN EN 1238, and/or mineral oil ML are especially advantageous. Besides these ingredients, such compositions have only insignificant amounts of other ingredients, typically less than 5% by weight, in particular less than 1% by weight.

The composition consists in particular of styrene block copolymer SB, polar modified styrene block copolymer PS, plant fibers PF, polyolefin P that is solid at 25° C., and optionally soft resin WH with a softening point between −10° C. and 40° C., measured by the ring and ball method of DIN EN 1238, and/or mineral oil ML.

Especially preferred compositions include, for example:

| Raw materials used (in % by weight) | | | |
|---|---|---|---|
| SB | 47.1 | 42.7 | 37.5 |
| ML | 28.3 | 25.6 | 22.5 |
| P | 9.4 | 8.6 | 7.5 |
| PS | 1.1 | 1.7 | 2.5 |
| PF | 14.1 | 21.4 | 37.5 |
| Total | 100 | 100 | 100 |
| Ratio PS:PF | 0.08 | 0.08 | 0.08 |

In addition, the invention includes a method for producing a molded body, comprising the steps
I) Preparing a composition such as that described above;
II) Shaping the composition to form a molded body.

Fundamentally the production in step I) takes place in the usual manner known to those skilled in the art for plastics.

Preferably in step I) first SB, ML and P are mixed together. Then PS is added and mixed and next PF is added and mixed again. Step I) preferably takes place at a temperature of 150-200° C., preferably in an extruder or a calender.

Step II) in molding preferably involves extrusion and/or calendering, typically on commercial machines. The molded body is preferably a membrane, in particular a roofing membrane or roofing sheeting. Such a membrane can be produced in a single method step as a continuous material, for example, by extrusion and/or calendering and/or lamination and may be rolled up into rolls, for example. The mass temperature in the extruder or calender may be in a range of 100-200° C., preferably 120-170° C., especially during extrusion and/or calendering and/or lamination.

In addition, the invention comprises a molded body obtained by extrusion and/or calendering of a composition such as that described above. The molded body is preferably a membrane, in particular a roofing membrane. Such a membrane preferably has a thickness of 1-2.5 mm.

Such membranes ensure an adequate seal in contact with water. Furthermore, they have good values with regard to flexibility and mechanical strength, which is an advantage in particular in the case of mechanical loads on construction sites. Furthermore, they have a good elasticity with respect to horizontal and vertical displacement. In addition, the composition allows inexpensive production and also ecological production due to the use of plant fibers as a renewable raw material. In addition, the membrane has a flexibility which allows the membrane to be rolled up, which facilitates shipping and application of the membrane to a substrate.

The molded bodies described in the present case may be used in a variety of ways, typically in the construction industry.

In addition, the invention comprises the use of a molded body, in particular a membrane such as that mentioned above for sealing substrates, in particular for sealing roofs.

EXAMPLES

TABLE 1

Characterization of the raw materials used and their designations

| | |
|---|---|
| SB | Kreaton ® G 1652M polymer, Kraton Polymers GmbH, Germany styrene/ethylene-butylene/styrene bock copolymer (SEBS) |
| P | Domolen ® 1101 N, DOMO Polypropylene b.v., Netherlands poly-α-olefin, polypropylene homopolymer melting point approx. 160° C. (10° C./min, ISO 11357-1/-3) |
| ML | Shell Ondina 933, Shell Deutschland Oil GmbH, Germany naphthenic mineral oil |
| PS | Kreaton ® FG1901 G polymer, Kraton Polymers GmbH, Germany maleic anhydride-grafted SEBS degree of grafting: 1.4-2% by weight |
| PF | JELUXYL ® WEHO 500 S, JELU plant, J. Ehrler GmbH, Germany wood fibers, ratio of the length of the plant fibers to the diameter of the plant fibers is 6:1-7:1 |
| PVB | BUTVAR B-98, Solutia, USA polyvinyl butyral |
| EBG | Elvaloy ® PTW, DuPont S.A., Switzerland ethylene-butyl acrylate/glycidyl methacrylate copolymer |
| EVA | VINNEX ® LL 2504, WACKER Chemie AG, Germany vinyl acetate-ethylene copolymer |

Comparative compositions ("VZ") VZ1-VZ4 and the composition according to the invention ("Z") Z1-Z4 were prepared by mixing the ingredients together according to the parts by weight listed in Table 2 or 3.

SB, ML and P were processed in a roll mill from the company Dr. Collin GmbH, Germany with the designation test roller model W 150 at a revolution of 20 rpm and at 170° C.

After homogenizing, PS was added to the compositions Z1-Z4 according to the invention and/or PVB was added to the comparative composition VZ2, EBG was added to the comparative composition VZ3 and EVA was added to the comparative composition VZ4, then each was homogenized further for two minutes. Next PF was added to the compositions Z1-Z4 according to the invention and/or to the comparative compositions VZ1-VZ4, and the mixture was homogenized for two more minutes at the same temperature.

Next the inventive compositions and/or the comparative compositions were pressed in the form of sheets (300×200×2 mm) at 160° C. and 60 bar using a heating press.

E Modulus (MPa), Tensile Strength (MPa) and Elongation at Break (%)

The measured values were measured according to DIN EN ISO 527 at a test speed of 200 mm/min and under a test climate of 23° C. with 50% relative atmospheric humidity.

Shore A Hardness [–]

The Shore A hardness was measured according to DIN EN 59.

Water Absorption at 60° C. After 266 Hours or 312 Hours (%)

For the water absorption at 60° C. after 266 hours or 312 hours (%), test bodies of 40×40×2 mm were prepared. Then the test bodies were stored for 24 hours at 50° C., weighed for the first time and then stored in water at 60° C. for 266 hours or 312 hours. Next the test bodies were removed from the water, adhering water was wiped off with a dry cloth and the sample body was then weighed a second time. The change in mass in percent was measured according to the equation:

Change in mass(%)=[(Weight after storage in water (second weighing)−Weight before water storage (first weighing))/Weight before storage in water (first weighing)]*100

TABLE 2

Comparative compositions VZ and results

| Compositions | VZ1 | VZ2 | VZ3 | VZ4 |
|---|---|---|---|---|
| Raw materials used (in % by weight) | | | | |
| SB | 43.5 | 42.7 | 42.7 | 42.7 |
| ML | 26.1 | 25.6 | 25.6 | 25.6 |
| P | 8.7 | 8.6 | 8.6 | 8.6 |
| PS | 0.0 | — | — | — |
| Butvar | — | 1.7 | — | — |
| Elvaloy | — | — | 1.7 | — |
| Vinnex | — | — | — | 1.7 |
| PF | 21.7 | 21.4 | 21.4 | 21.4 |
| Total | 100 | 100 | 100 | 100 |
| Ratio PS:PF | 0 | 0 | 0 | 0 |
| Results | | | | |
| E modulus (MPa) | 34.23 | 32.18 | 25.5 | 27.37 |
| Tensile strength (MPa) | 2.85 | 2.89 | 2.39 | 2.59 |
| Elongation at break (%) | 118.94 | n.a. | n.a. | n.a. |
| Shore A hardness [—] | 68.4 | n.a. | n.a. | n.a. |
| Water absorption at 60° C. after 266 hours (%) | 6.691 | 7.453 | 6.157 | 12.577 |
| Water absorption at 60° C. after 312 hours (%) | 6.691 | n.a. | n.a. | n.a. |

TABLE 3

Inventive compositions Z and results

| Compositions | Z1 | Z2 | Z3 | Z4 |
|---|---|---|---|---|
| Raw materials used (in % by weight) | | | | |
| SB | 43.1 | 42.7 | 41.7 | 40.0 |
| ML | 25.9 | 25.6 | 25.0 | 24.0 |
| P | 8.6 | 8.6 | 8.3 | 8.0 |
| PS | 0.8 | 1.7 | 4.2 | 8.0 |
| PF | 21.6 | 21.4 | 20.8 | 20.0 |
| Total | 100 | 100 | 100 | 100 |
| Ratio PS:PF | 0.04 | 0.08 | 0.2 | 0.4 |
| Results | | | | |
| E modulus (MPa) | 36.29 | 41.68 | 29.18 | 31.90 |
| Tensile strength (MPa) | 3.98 | 4.23 | 3.73 | 4.06 |
| Elongation at break (%) | n.a. | 135.77 | 159.47 | n.a. |
| Shore A hardness [—] | n.a. | 78.3 | 75.5 | n.a. |
| Water absorption at 60° C. after 266 hours (%) | n.a. | 5.107 | n.a. | n.a. |
| Water absorption at 60° C. after 312 hours (%) | n.a. | 5.732 | 6.207 | n.a. |

These results show that the compositions according to the invention are characterized by a lower water absorption, a higher tensile strength and higher Shore A hardness in comparison with the reference composition VZ1. In particular, the composition Z2, which has a PS:PF ratio of 0.08, has especially advantageous values with regard to water absorption at 60° C. after 266 hours or after 312 hours and with regard to Shore A hardness.

It can also be seen from these results that the composition Z2 according to the invention with 1.7% by weight PS in comparison with reference compositions VZ2-VZ4, which have 1.7% by weight of the compatibilizers PVB, EBG and/or EVA, are characterized by a lower water absorption at 60° C. after 266 hours and a higher tensile strength and a higher E modulus.

The present invention is of course not limited to the exemplary embodiment shown and described here.

The invention claimed is:

1. A composition comprising
   a) 20-90% by weight styrene block copolymer, selected from the group consisting of styrene/isoprene block copolymer (SIS), styrene/ethylene-butylene/styrene block copolymer (SEBS), styrene/ethylene-propylene/styrene block copolymer (SEPS) and styrene/ethylene-propylene block copolymer (SEP);
   b) 0.08-10% by weight maleic anhydride-grafted styrene block copolymer;
   c) 1-50% by weight plant fibers; and
   d) 0.05-20% by weight polyolefin that is solid at 25° C.;
   wherein the plant fibers have a ratio of the length of the plant fibers to the diameter of the plant fibers of 5:1-10:1.

2. The composition according to claim 1, further comprising:
   e) 4-45% by weight of:
   soft resin with a softening point between −10° C. and 40° C., measured according to the ring and ball method of DIN EN 1238
   and/or
   mineral oil.

3. The composition according to claim 2, wherein the soft resin has a softening point between 0 and 25° C.

4. The composition according to claim 2, wherein the soft resin is a hydrocarbon resin.

5. The composition according to claim 2, wherein the mineral oil is naphthenic mineral oil.

6. The composition according to claim 1, further comprising:
   e) 4-45% by weight mineral oil.

7. The composition according to claim 1, wherein the plant fibers have a cellulose content of more than 30% by weight, based on the total weight of the plant fibers.

8. The composition according to claim 1, wherein the polyolefin has a softening point between 70° C. and 170° C., measured according to the ring and ball method of DIN EN 1238.

9. The composition according to claim 1, wherein the polyolefin is a thermoplastic poly-α-olefin.

10. The composition according to claim 1, wherein the ratio of the % by weight of the maleic anhydride-grafted styrene block copolymer: plant fibers is 0.01-0.5, based on the composition.

11. A method for producing a molded body comprising the steps of:
 I) Preparing a composition according to claim 1; and
 II) Shaping the composition, to form a molded body.

12. A molded body obtained by extrusion and/or calendering of a composition according to claim 1.

13. A molded body according to claim 12 in the form of a membrane, having a thickness of 1-2.5 mm.

14. The composition according to claim 1, wherein a degree of grafting of the maleic anhydride-grafted styrene block copolymer is 1.4 to 10%.

15. The composition according to claim 1, wherein the maleic anhydride-grafted styrene block copolymer is present in an amount of 1.5 to 2.5% by weight.

16. A composition comprising:
 a) 20-90% by weight styrene block copolymer, selected from the group consisting of styrene/isoprene block copolymer (SIS), styrene/ethylene-butylene/styrene block copolymer (SEBS), styrene/ethylene-propylene/styrene block copolymer (SEPS) and styrene/ethylene-propylene block copolymer (SEP);
 b) 0.08-10% by weight maleic anhydride-grafted styrene block copolymer;
 c) 1-50% by weight plant fibers; and
 d) 0.05-20% by weight polyolefin that is solid at 25° C.;
 wherein:
  the ratio of the % by weight of the maleic anhydride-grafted styrene block copolymer: plant fibers is 0.08-0.2, based on the composition; and
  the plant fibers have a ratio of the length of the plant fibers to the diameter of the plant fibers of 5:1-10:1.

17. The composition according to claim 16, wherein the plant fibers are wood fibers.

18. The composition according to claim 16, wherein a degree of grafting of the maleic anhydride-grafted styrene block copolymer is 1.4 to 10%.

19. The composition according to claim 16, wherein the maleic anhydride-grafted styrene block copolymer is present in an amount of 1.5 to 2.5% by weight.

* * * * *